Patented Feb. 24, 1948

2,436,463

UNITED STATES PATENT OFFICE 2,436,463

ONION FLAVORED MELON STUFFING

Edward Van Dellen and Richard N. Ball, Visalia, Calif.

No Drawing. Application March 24, 1945, Serial No. 584,737

5 Claims. (Cl. 99—100)

This invention is a continuation in part of our invention for food product filed in the United States Patent Office July 28, 1942, Serial No. 452,612, now Patent No. 2,382,682.

Whereas in the application above identified we have described a food product utilizing a material for the stuffing of olives which acts as a substitute for pimiento, the present invention is directed to an onion substitute for use in stuffing olives.

Heretofore, pitted olives have been stuffed with pearl onions. Pearl onions are an imported product from Holland and at present are unobtainable. The present invention utilizes a substitute for pearl onions, which substitute has features which render it superior to pearl onions. The present substitute has a favorable price differential when considered both as to the original cost of obtaining pearl onions and as to the cost of stuffing the olives.

An object of the present invention is the provision of a substitute for onions in the stuffing of olives which gives the stuffed olive an attractive appearance and which while not intended for the purpose of imitating onion-stuffed olives, yet for all practical purposes is just as attractive and the flavor just as definite.

The ordinary olive which was formerly obtainable on the market and stuffed with pearl onions did not give to the olive an uniform flavor. An object of the present invention is to provide a method of treating the olive and its stuffing material in such a manner that the olive tissue and stuffing material are flavored uniformly.

We preferably utilize as a stuffing material for olives which have been pitted a vegetable or fruit substance characterized in that it has, after processing, no definite flavor of its own. As an example of such a vegetable or fruit substance we mention pumpkin, squash, zucca melon and Jerusalem artichoke.

Taking by way of example the processing of the zucca melon, the other substances named and those having similar characteristics being processed in the same manner, the zucca melon is harvested while the skin is tender, it is then peeled, cleaned and cut into a slabs which are thereafter submerged within a salt brine. This salt brine may be held in barrels or tanks, with a salt concentration of approximately 15%. The brine strength is preferably maintained above 8% during the curing operation through the simple expedient of adding more salt as the brine concentration lowers. After the melon has been cured the salt concentration may be raised to 20%, which is sufficient to keep the melon in condition for use indefinitely. No particular length of time for effecting the curing operation is stated, as such operation is well known to those skilled in the art.

The olives which are to receive the stuffing material are first pitted and then placed in a suitable barrel containing a brine solution, the salt concentration of which does not exceed 8%. Interspersed with the olives are sliced onions or dehydrated onion powder. We have found it expedient to use from 30 to 40 pounds of sliced fresh onion for each 50 gallons of pitted olives, or from 3 to 4 pounds of dehydrated powdered onion for each 50 gallons of pitted olives. The barrels which hold the pitted olives and the onion are allowed to stand in the sun or in a warm place for several weeks, being rolled to permit the onion flavor to permeate the olives, which thereby develops a flavor which remains in the olives throughout the balance of the process to be described.

Olives contain a large percentage of oil, and and we have found that when the pitted olives are placed in a barrel and throughly surrounded by fresh sliced onion or dehydrated powdered onion, that the oil in the olives absorbs the flavor of the onion and retains said flavor. It is evident that the pitted cavity of the olive does not have a skin and therefore absorbs the flavor quite rapidly. While we have stated that the barrels containing the olives and onions should be placed in a warm place, still the process will operate without the use of heat but requires a longer period of time and, in addition, the use of more onion. This for the reason that the flavoring of the olive by the onion is an absorption process.

When it is desired to stuff the pitted olives, the slabs of melon which have been processed as previously stated are sliced to the approximate thickness desired to run through a properly shaped grid, such as a hexagonal grid, to size the slabs and form pellets which will readily fit within the olive cavity. The melon pellets are first freshened with water to a salt concentration of not greater than 8%, which corresponds to the salt concentration of the olives. Thereafter the pellets are stuffed into the pitted olives and the olives are placed in the same brine until ready for packing in containers. The olives after processing are packed in suitable containers, with a small percent fresh salt brine solution covering the same. For instance, if the container is a glass jar, the olives are placed in the salt brine and covered, the jar being sealed without head space.

When green olives are stuffed, the green olives are not heat processed or treated after sealing, for the reason that green olives contain an acid which together with the higher salt acts as a natural preservative and therefore does not require the use of heat to sterilize the olives. In the case of ripe olives, said olives are neutral in acidity and therefore heat processed in order to preserve them.

The resultant olives have uniform onion flavor, and the melon pellets, when processed as herein stated, have no flavor of their own. However, the melon pellets absorb the flavor from the olive tissue, as does likewise the fresh brine within which the olives are packed. The practice of the process set forth results in a stuffed olive product which has a uniform onion flavor.

In the present invention it has been found that the most pleasing flavors of the onion are absorbed by the olive and the stuffing. People who cannot eat onions have no after taste upon eating the onion flavored melon alone or the olive together with the stuffing.

We claim:

1. A method of imparting onion flavoring to olives and stuffing therefor, which consists in first pitting the olives and placing them in a brine solution, placing onion material in said solution and contiguous to said olives, thereafter stuffing the olives with a flavorless, flavor-absorbing edible material.

2. A methd of imparting onion flavoring to olives and a stuffing, which consists in placing pitted olives in a brine solution and interspersing with said olives onion substance, allowing the onion substance and olives to remain in contact until the onion flavor has permeated the olives, and thereafter stuffing said olives with a substantially flavorless, flavor-absorbing material adapted to absorb onion flavor by contact with its olive.

3. A method of forming a food product, which consists in first pitting olives and placing the same in a brine solution, interspersing in said solution with said olives onion material, permitting said onion material and olives to stand in contact for a period of time to allow the onion flavoring to permeate the olive, thereafter curing a flavor-absorbing stuffing material by placing the same in a brine solution, said stuffing material being characterized in that said brine solution removes any characteristic flavor therefrom, cutting the cured stuffing material to size and placing the same in the pit cavity of the olive, the said stuffing material absorbing the onion flavor from the olive tissue.

4. A food product, including a pitted olive that is permeated with the onion flavor and a flavor absorbing stuffing material in the pit cavity of said olive.

5. A food product, including a pitted olive and a cured zucca melon stuffing in the pit cavity of said olive.

EDWARD VAN DELLEN.
RICHARD N. BALL.

REFERENCES CITED

The following references are of record in the file of this patent:

UNITED STATES PATENTS

| Number | Name | Date |
|---|---|---|
| 268,869 | Conroy et al. | Dec. 12, 1882 |
| 513,252 | Trillich | Jan. 23, 1894 |
| 1,956,362 | Rolle | Apr. 24, 1934 |
| 2,272,990 | Forkner et al. | Feb. 10, 1942 |